UNITED STATES PATENT OFFICE.

HERMAN TIMPE, OF AMSTERDAM, NETHERLANDS, ASSIGNOR TO NAAMLOOZE VENNOOTSCHAP HOLLANDSCHE ZIJDE MAATSCHAPPIJ, OF AMSTERDAM, NETHERLANDS, A COMPANY OF THE NETHERLANDS.

MANUFACTURE OF ARTIFICIAL SILK.

1,087,700.

Specification of Letters Patent.  Patented Feb. 17, 1914.

No Drawing.  Application filed June 17, 1911. Serial No. 633,786.

*To all whom it may concern:*

Be it known that I, HERMAN TIMPE, a subject of the Emperor of Germany, residing at Weesperzijde No. 125, Amsterdam, Province of Noord, Kingdom of the Netherlands, have invented certain new and useful Improvements in and Relating to the Manufacture of Artificial Silk, of which the following is a specification.

This invention relates to the manufacture of artificial silk from milk and particularly to the process in which the albumins of the milk are decomposed by the action of a salt of pyrophosphoric acid.

Previous attempts to produce from albuminous substances silk-like threads having similar qualities to the ordinary animal product have had but little success. The most comprehensive experiments in this connection have been on casein preparations and the product obtained was always hard and brittle, fine threads such as are necessary for the production of a good silk not being possible of production. It is true that a certain amount of flexibility could be given to the product by means of chemical additions such as glycerin or the like but this is only at the cost of strength. Casein products cannot therefore be considered to have previously yielded really silk-like threads.

My invention is distinguished from the methods heretofore employed, in that it does not use casein as a starting material, but instead employs as a raw material the protein substances which remain in cows' milk after the same has been reacted on by salts of pyrophosphoric acid or pyrophosphates, and the casein precipitated thereby has been removed therefrom. The protein substances left in the whey after the removal of the casein thus precipitated, consist in lactalbumin and a derivative product of casein. These protein substances are then thrown out from the whey by means of such reagents as are ordinarily used in precipitating casein and albuminates. The product thus precipitated is then rendered plastic by the addition of a small amount of ammonia or other alkali, whereupon the same may be worked into the finest silk-like threads which are elastic, and which possess also great strength and great toughness, thereby adapting them in a marked degree for all purposes where silk is employed.

The following example serves to disclose my invention in detail:

A solution of a pyrophosphoric salt is slowly added to milk, preferably skim milk, for example, to each liter of milk at least three gms. of dry sodium pyrophosphate or the equivalent amount of another pyrophosphate. The milk curdles and forms at first into a jelly-like mass. After standing for a short time, especially in a heated condition, the solid materials separate out sufficiently from the whey so that a separation of the two is possible. The albuminous substance in solution in the whey is separated out therefrom by means of diluted acids or other known precipitating agents, and after the liquid present has been pressed out the product is converted into a tough plastic mass by adding a small amount of ammonia or other alkali. If the material is to be made into threads the albumin precipitated out by the acids is first washed with water and then again dissolved completely in diluted alkali lye, whereupon the solution is filtered and the product precipitated out by dilute acids. The product purified in this manner is freed from moisture by pressing and then converted into the plastic form by means of ammonia or other alkali. This material which can be drawn out into the finest threads, is worked in known manner and hardened by the action of formaldehyde or other known hardening agent.

By applicant's process which involves the treatment of the whey left after reaction on the milk with a salt of pyrophosphoric acid, quite a different precipitation from that which is usually carried out by means of acid, occurs in the milk. When a solution of such salt of pyrophosphoric acid is added to the milk, I find that a voluminous precipitate is formed, the casein thrown down forming into a jelly-like mass. When this precipitate is separated from the fluid it will be found that the whey still contains the greater part of casein, but this casein has now assumed an altered form. The casein when precipitated by means of an acid assumes a flocky incoherent form, whereas when precipitated according to this invention the casein assumes the form of a glutinous and stringy mass which can be drawn out into threads. The whey left after the removal of this precipitate contains lactalbumin and a derivative product of casein and this product has essentially different properties from the original casein. Thus, for example it contains no paracasein, a body which is always thrown down when ordinary milk is treated with rennet ferment and which is a characteristic product when casein of ordinary milk is treated with rennet ferment.

What I claim is:—

1. The process which consists in adding a pyrophosphate to milk, removing the resultant precipitate of casein, then precipitating the protein substances from the remaining liquid and treating them with alkali for the purpose of forming them into a plastic mass.

2. The process which consists in adding a pyrophosphate to milk, removing the resultant precipitate of casein, then precipitating the protein substances from the remaining liquid and dissolving the same in an alkali solution, then reprecipitating them with dilute acid.

3. The process which consists in adding a pyrophosphate to milk, removing the resultant precipitate of casein, then precipitating the protein substances from the remaining liquid and dissolving the same in an alkali solution, then reprecipitating them with dilute acid, and then treating with alkali to form the same into a plastic mass.

4. The process which consists in adding a pyrophosphate to milk, removing the resultant precipitate of casein, then precipitating the protein substances from the remaining liquid and dissolving the same in an alkali solution, then reprecipitating them with dilute acid, then treating with alkali to form the same into a plastic mass, and then drawing the mass out into threads and hardening the threads.

5. The process which consists in adding a pyrophosphate to milk, removing the resultant precipitate of casein, then precipitating the protein substances from the remaining liquid and dissolving the same in an alkali solution, then reprecipitating them with dilute acid, then treating with alkali to form the same into a plastic mass and then drawing the mass out into threads and hardening the threads by treating with formic aldehyde.

6. As a new albuminous product, a thread formed from a plastic mass consisting of lactalbumin and a casein derivative containing no paracasein.

7. As a new albuminous product, a thread consisting of a thread formed from a plastic protein mass formed from whey remaining after reacting on milk with a salt of pyrophosphoric acid with a coagulating agent, said mass consisting of lactalbumin and a casein derivative containing no paracasein.

In testimony whereof I have hereunto set my hand in presence of two subscribing witnesses.

HERMAN TIMPE.

Witnesses:
  THOMAS HOLIHAN,
  D. P. DE YOUNG.